(12) United States Patent
Li et al.

(10) Patent No.: US 11,901,617 B1
(45) Date of Patent: Feb. 13, 2024

(54) MINIATURIZED ULTRA-LOW FREQUENCY ANTENNA

(71) Applicant: Anhui University, Anhui (CN)

(72) Inventors: Yingsong Li, Anhui (CN); Zhixiang Huang, Anhui (CN)

(73) Assignee: ANHUI UNIVERSITY, Anhui (CN)

( * ) Notice: Subject to any disclaimer, the term of this patent is extended or adjusted under 35 U.S.C. 154(b) by 0 days.

(21) Appl. No.: 18/463,128

(22) Filed: Sep. 7, 2023

(30) Foreign Application Priority Data

Mar. 28, 2023 (CN) .......................... 202310307833.1

(51) Int. Cl.
*H01Q 1/24* (2006.01)
*H01Q 1/36* (2006.01)

(52) U.S. Cl.
CPC .............. *H01Q 1/36* (2013.01); *H01Q 1/241* (2013.01)

(58) Field of Classification Search
CPC ............ H01Q 1/24; H01Q 1/241; H01Q 1/36; H01Q 1/52; H01Q 5/307; H01Q 5/10; H01Q 15/24
See application file for complete search history.

(56) References Cited

U.S. PATENT DOCUMENTS

| | | | |
|---|---|---|---|
| 10,727,571 B2 | 7/2020 | Vollmer et al. | |
| 11,145,971 B1 | 10/2021 | Cripe | |
| 11,678,112 B2* | 6/2023 | Ghaffarivardavagh | H04B 11/00 367/157 |
| 11,750,301 B1* | 9/2023 | Li | H01Q 1/243 343/702 |
| 2013/0021213 A1 | 1/2013 | Chernokalov | |

(Continued)

FOREIGN PATENT DOCUMENTS

| | | | |
|---|---|---|---|
| CN | 103703613 A | 4/2014 | |
| CN | 107154535 A | 9/2017 | |

(Continued)

OTHER PUBLICATIONS

Yinan Wang et al., "A Low-Frequency MEMS Magnetoelectric Antenna Based on Mechanical Resonance," Micromachines, May 30, 2022, 13, 864.

(Continued)

*Primary Examiner* — Thai Pham
(74) *Attorney, Agent, or Firm* — Pilloff Passino & Cosenza LLP; Sean A. Passino; Rachel K. Pilloff

(57) ABSTRACT

Provided is a miniaturized ultra-low frequency antenna, including upper layer positive and negative electrodes, middle layer positive and negative electrodes and lower layer positive and negative electrodes, and a polyvinylidene fluoride column. The polyvinylidene fluoride column is respectively connected with the upper layer positive and negative electrodes, the middle layer positive and negative electrodes and the lower layer positive and negative electrodes. The polyvinylidene fluoride column is coated with stress electromagnetic conversion material layers. The upper layer positive and negative electrodes, the middle layer positive and negative electrodes and the lower layer positive and negative electrodes drive the polyvinylidene fluoride column to generate a deflection force through a voltage, and the stress electromagnetic conversion material layers are prompted to radiate electromagnetic waves and radiate under an action of the deflection force.

9 Claims, 6 Drawing Sheets

(56) References Cited

U.S. PATENT DOCUMENTS

| | | |
|---|---|---|
| 2017/0229772 A1 | 8/2017 | Tenno |
| 2018/0166788 A1 | 6/2018 | Pan et al. |
| 2019/0363452 A1 | 11/2019 | Ting et al. |
| 2020/0321512 A1 | 10/2020 | Sun et al. |
| 2021/0028544 A1* | 1/2021 | Lasko .................... H01Q 7/08 |

FOREIGN PATENT DOCUMENTS

| | | |
|---|---|---|
| CN | 207250726 U | 4/2018 |
| CN | 108615966 A | 10/2018 |
| CN | 110098475 A | 8/2019 |
| CN | 113067135 A | 7/2021 |
| CN | 215497073 U | 1/2022 |
| CN | 114430105 A | 5/2022 |
| CN | 114499552 A | 5/2022 |
| CN | 114865308 A | 8/2022 |
| CN | 115224473 A | 10/2022 |
| GB | 2489524 A | 10/2012 |
| WO | WO-2012131376 A1 * | 10/2012 ............... H01Q 1/22 |
| WO | 2017148237 A1 | 9/2017 |
| WO | 2018046254 A1 | 3/2018 |
| WO | 2021224584 A1 | 11/2021 |
| WO | 2022042648 A1 | 3/2022 |

OTHER PUBLICATIONS

Yunxiao Xu, "Research on Magnetic Mechanical Antenna," Thesis Submitted to Shanghai Jiao Tong University for the Degree of Engineering Master, Jan. 2019, School of Electronic Information and Electrical Engineering Shanghai Jiao Tong University.

Xianfeng Liang et al., "Roadmap on Magnetoelectric Materials and Devices," IEEE Transactions on Magnetics, Aug. 2021, vol. 57, No. 8.

First Search Report for China Application No. 2023103078331.

Notice to Grant for China Application No. 2023103078331, dated May 10, 2023.

* cited by examiner

MINIATURIZED ULTRA-LOW FREQUENCY ANTENNA

CROSS-REFERENCE TO RELATED APPLICATIONS

This disclosure claims priority to Chinese Patent Application No. 202310307833.1, filed on Mar. 28, 2023, the contents of which are hereby incorporated by reference.

TECHNICAL FIELD

The disclosure belongs to the technical field of antennas, and in particular to a miniaturized ultra-low frequency antenna.

BACKGROUND

Conventional ultra-low frequency antennas are mainly designed with metal wires. The antennas are often used in underground prospecting and underground communication, but are difficult to meet requirements of air-water communication, unmanned aerial vehicle carrying and satellite communication. In addition, ultra-low frequency, very low frequency and low frequency antennas may not be used in the medical field to replace existing ultrasonic detection. With development and application requirements of radio technology, very low frequency, low frequency and even ultra-low frequency have become one of important research fields. Compared with designs of high frequency antennas, these antennas are large in size, heavy in weight, inefficient and inconvenient to install and design, which may not meet needs of unmanned aerial vehicles, satellites and personal medical care, and also seriously limit applications of very low frequency, low frequency and ultra-low frequency. In recent years, conventional high frequency may not penetrate a human body, and the applications of low frequency, very low frequency and ultra-low frequency in the field of medical detection have also attracted attention of scholars worldwide. At the same time, compared with the ultrasonic detection, low frequency, very low frequency and ultra-low frequency may not only detect and penetrate the human body, but also transmit key information in real time, and also have an ability of cross-media communication for penetrating water and realizing water-air information transmission.

In recent years, with a demand for low frequency, very low frequency and ultra-low frequency in personal communication, medical communication, medical monitoring, underwater communication and air-space-sea integration construction, designs of very low frequency, very low frequency and ultra-low frequency antennas are developing towards compact, light weights, chip and miniaturization. Especially with rapid development of unmanned systems, the low frequency, very low frequency and ultra-low frequency antennas may be installed on the unmanned systems, such as unmanned aerial vehicles, to achieve remote rescue, remote life detection and monitoring, and ocean rescue. However, conventional low frequency, very low frequency and ultra-low frequency antennas are mainly designed with thin wires or long wires, or are wound with enameled wires, thus greatly increasing lengths and weights, making it inconvenient to install and use on unmanned equipment. Moreover, polarization of the antennas is difficult to control, and an efficiency is low. In addition, these antennas are not convenient to meet applications of air-water cross-media communication, single soldier carrying, remote medical monitoring, etc., thus limiting the applications of low frequency, very low frequency and ultra-low frequency.

SUMMARY

Aiming at problems of compact, difficulty in polarization control, single frequency band, large sizes, low efficiency and the like of low frequency, very low frequency and ultra-low frequency at present, the disclosure provides a miniaturized ultra-low frequency antenna to realize miniaturization, chip, controllable polarization and controllable frequency band design, and realize a superior performance of lower frequency, very low frequency and ultra-low frequency.

In order to achieve an above objective, the disclosure adopts a following technical scheme.

A miniaturized ultra-low frequency antenna, including upper layer positive and negative electrodes, middle layer positive and negative electrodes and lower layer positive and negative electrodes, and a polyvinylidene fluoride column. The polyvinylidene fluoride column is respectively connected with the upper layer positive and negative electrodes, the middle layer positive and negative electrodes and the lower layer positive and negative electrodes. The polyvinylidene fluoride column is coated with stress electromagnetic conversion material layers. The upper layer positive and negative electrodes, the middle layer positive and negative electrodes and the lower layer positive and negative electrodes drive the polyvinylidene fluoride column to generate a deflection force through a voltage, and the stress electromagnetic conversion material layers are prompted to radiate electromagnetic waves and radiate under an action of the deflection force.

Optionally, the polyvinylidene fluoride column is respectively connected with the upper layer positive and negative electrodes, the middle layer positive and negative electrodes and the lower layer positive and negative electrodes through synapses.

Optionally, positive electrodes of the upper layer positive and negative electrodes, the middle layer positive and negative electrodes and the lower layer positive and negative electrodes are placed vertically in parallel or orthogonal.

Optionally, the upper layer positive and negative electrodes, the middle layer positive and negative electrodes and the lower layer positive and negative electrodes are fed by a same direct current voltage source at the same time, or are respectively connected with different voltage sources to realize different voltage feeding.

Optionally, the positive electrodes of the upper layer positive and negative electrodes, the middle layer positive and negative electrodes and the lower layer positive and negative electrodes are located on a same side or on different sides.

Optionally, the upper layer positive and negative electrodes, the middle layer positive and negative electrodes and the lower layer positive and negative electrodes all adopt left parts as the positive electrodes and right parts as negative electrodes.

Optionally, a left part of the upper layer positive and negative electrodes is a positive electrode, and a right part is a negative electrode. A left part of the middle layer positive and negative electrodes is a negative electrode, and a right part is a positive electrode. A left part of the lower layer positive and negative electrodes is a positive electrode and a right part is a negative electrode.

Optionally, left and right electrodes of the upper layer positive and negative electrodes, the middle layer positive and negative electrodes and the lower layer positive and negative electrodes are arranged in an arrangement and combination structure.

Optionally, the miniaturized ultra-low frequency antenna is used to design a mobile phone antenna or a mobile terminal antenna.

Compared with the prior art, the disclosure has following beneficial effects.

The miniaturized ultra-low frequency antenna according to the disclosure uses positive and negative electrodes to drive the polyvinylidene fluoride column to generate the deflection force through the voltage, and stress electromagnetic conversion materials are prompted to radiate electromagnetic waves and radiate under an action of the deflection force. Because different electrodes are used to drive the polyvinylidene fluoride column at different positions, the polyvinylidene fluoride column generates different deflection forces at different positions. The polyvinylidene fluoride column is twisted to generate a stress, so that the stress electromagnetic conversion materials excite electromagnetic waves and radiate. The positive and negative electrodes according to the disclosure may be excited by a same voltage to generate a same frequency and enhance an efficiency. Electrode spacing may also be designed. Using different voltages to excite different electrodes may not only reduce an influence between the different electrodes, but also realize a design of multi-band antennas. The polarization control of the antenna may also be realized through a parallel or orthogonal design of upper and lower positions of a plurality of electrodes to receive electromagnetic waves with different polarizations. The polarization control, electromagnetic radiation efficiency enhancement, gain enhancement and an application of electromagnetic efficiency enhancement may also be achieved through control and combination of directions of the positive and negative electrodes. The designed polyvinylidene fluoride column may adopt a segmented design, and has different diameters at different positions of the positive and negative electrodes, and may also realize a multi-band design. In addition, due to combined use of electrode positions, excitation voltage magnitudes, voltage excitation directions, the diameters of the polyvinylidene fluoride column, and the electrodes and the voltages, different modes of excitation and resonance are generated, electromagnetic waves with different frequencies and polarizations are generated, and the size of the antenna is greatly reduced. The disclosure may not only design ultra-low frequency antennas, but also design low frequency, very low frequency antennas and microwave antennas. Antennas designed by the disclosure is very small, may realize chip and miniaturization, and have flexible polarization control and resonance frequency control. These antennas may not only be installed on unmanned aerial vehicles, satellites and other equipment, but also be used in aircraft, carrying equipment, frogman communication, air-water communication and detection, aerospace equipment and the like. These antennas not only break through difficulties of conventional very low frequency, single antenna frequency, difficult polarization control and multi-band design, but also realize a miniaturization design of the antennas, reduce sizes and weights of the antennas. Moreover, a chip design may be realized, and micro-systems may be directly integrated, thus greatly promoting a wide application of very low frequency and even ultra-low frequency, and putting forward new solutions for the polarization control and the multi-band design of low frequency, very low frequency and ultra-low frequency antennas in the future.

BRIEF DESCRIPTION OF THE DRAWINGS

In order to explain technical schemes of the disclosure or technical schemes in the prior art more clearly, drawings needed in embodiments are briefly introduced below. Obviously, the drawings in a following description are only some embodiments of the disclosure. For ordinary people in the field, other drawings may be obtained according to these drawings without paying a creative labor.

DETAILED DESCRIPTION OF THE EMBODIMENTS

Figure 1:
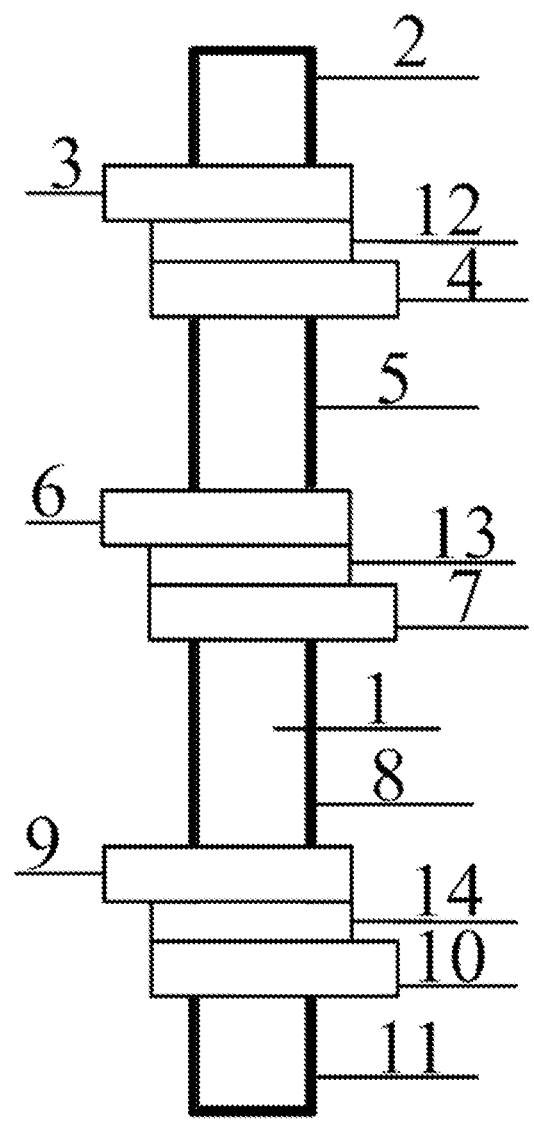
FIG. 1 is a front view of a miniaturized ultra-low frequency antenna according to embodiment 2 of the disclosure.

In the following, technical schemes in embodiments of the disclosure may be clearly and completely described with reference to attached drawings. Obviously, the described embodiments are only a part of the embodiments of the disclosure, but not all embodiments. Based on the embodiments in the disclosure, all other embodiments obtained by ordinary technicians in the field without a creative labor belong to a scope of protection of the disclosure.

In order to make above objects, features and advantages of the disclosure more obvious and easier to understand, the disclosure may be further described in detail with the drawings and specific embodiments.

With development of new materials and technologies, ultra-low frequency antennas are developing in a direction of miniaturization and even chip. Miniaturized and efficient ultra-low frequency antennas are developed to realize polarization control of very low frequency, low frequency and ultra-low frequency antennas and designs of multi-band, miniaturization, chip and lightweight, and to improve antenna performances. The antennas may be installed on unmanned aerial vehicles, satellites and other equipment, and may also be used in aircraft, carrying equipment, frogman communication, air-water communication and detection and aerospace equipment.

Embodiment 1

An embodiment of the disclosure provides a miniaturized ultra-low frequency antenna, including upper layer positive and negative electrodes, middle layer positive and negative electrodes and lower layer positive and negative electrodes, and a polyvinylidene fluoride column. The polyvinylidene fluoride column is respectively connected with the upper layer positive and negative electrodes, the middle layer positive and negative electrodes and the lower layer positive and negative electrodes. The polyvinylidene fluoride column is coated with stress electromagnetic conversion material layers. The upper layer positive and negative electrodes, the middle layer positive and negative electrodes and the lower layer positive and negative electrodes drive the polyvinylidene fluoride column to generate a deflection force through a voltage, and the stress electromagnetic conversion material layers are prompted to radiate electromagnetic waves and radiate under an action of the deflection force.

As an implementation of the embodiment of the disclosure, the polyvinylidene fluoride column is respectively connected with the upper layer positive and negative electrodes, the middle layer positive and negative electrodes and the lower layer positive and negative electrodes through synapses.

As an implementation of the embodiment of the disclosure, positive electrodes of the upper layer positive and negative electrodes, the middle layer positive and negative electrodes and the lower layer positive and negative electrodes are placed vertically in parallel or orthogonal.

As an implementation of the embodiment of the disclosure, the upper layer positive and negative electrodes, the middle layer positive and negative electrodes and the lower layer positive and negative electrodes are fed by a same direct current (DC) voltage source at the same time, or are respectively connected with different voltage sources to realize different voltage feeding.

As an implementation of the embodiment of the disclosure, the positive electrodes of the upper layer positive and negative electrodes, the middle layer positive and negative electrodes and the lower layer positive and negative electrodes are located on a same side or on different sides.

As an implementation of the embodiment of the disclosure, the upper layer positive and negative electrodes, the middle layer positive and negative electrodes and the lower layer positive and negative electrodes all adopt left parts as the positive electrodes and right parts as negative electrodes.

As an implementation of the embodiment of the disclosure, a left part of the upper layer positive and negative electrodes is a positive electrode, and a right part is a negative electrode. A left part of the middle layer positive and negative electrodes is a negative electrode, and a right part is a positive electrode. A left part of the lower layer positive and negative electrodes is a positive electrode and a right part is a negative electrode.

As an implementation of the embodiment of the disclosure, left and right electrodes of the upper layer positive and negative electrodes, the middle layer positive and negative electrodes and the lower layer positive and negative electrodes are arranged in an arrangement and combination structure.

As an implementation of the embodiment of the disclosure, the miniaturized ultra-low frequency antenna is used to design a mobile phone antenna or a mobile terminal antenna.

In the embodiment of the disclosure, the upper layer positive and negative electrodes, the middle layer positive and negative electrodes and the lower layer positive and negative electrodes are respectively placed at an upper part, a middle part and a lower part of the polyvinylidene fluoride column, and intervals between each three positive and negative electrodes may be the same or different.

In the embodiment of the disclosure, the upper layer positive and negative electrodes, the middle layer positive and negative electrodes and the lower layer positive and negative electrodes may be powered by a same voltage source at the same time with a same power supply voltage, or by different voltage sources with different voltages, so as to realize a multi-band design of the ultra-low frequency antenna.

In the embodiment of the disclosure, the upper layer positive and negative electrodes, the middle layer positive and negative electrodes and the lower layer positive and negative electrodes are fed through different combinations, making directions of deflection forces generated by the polyvinylidene fluoride column inconsistent, thus realizing a polarization control of the ultra-low frequency antenna.

In the embodiment of the disclosure, positions, excitation voltages and voltage excitation directions of the upper layer positive and negative electrodes, the middle layer positive and negative electrodes and the lower layer positive and negative electrodes are designed flexibly.

In the embodiment of the disclosure, a number of positive and negative electrodes is increased or decreased according to multi-band requirements and polarization requirements.

In the embodiment of the disclosure, designs of different frequencies, a same frequency, multi-band and polarization control are realized by controlling the positions of the positive and negative electrodes, the excitation voltages and the voltage excitation directions.

Embodiment 2

Figure 2:
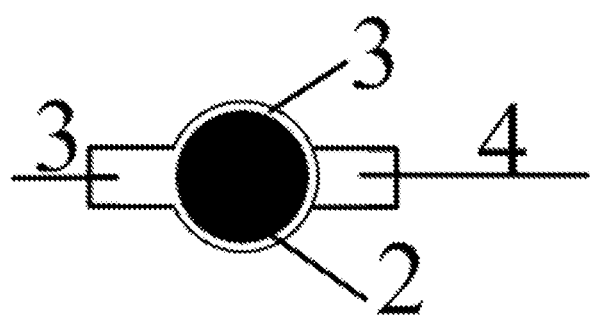
FIG. 2 is a top view of a miniaturized ultra-low frequency antenna according to embodiment 2 of the disclosure.
Figure 3:
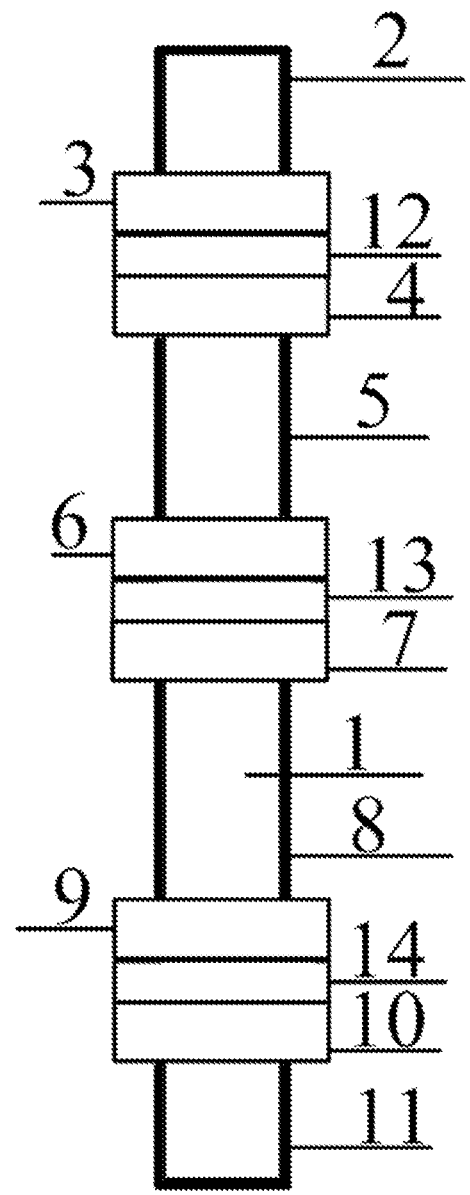
FIG. 3 is a side view of a miniaturized ultra-low frequency antenna according to embodiment 2 of the disclosure.

As shown in FIG. 1, FIG. 2 and FIG. 3, a miniaturized ultra-low frequency antenna provided by an embodiment of the disclosure includes three pairs of positive and negative electrodes, which are upper layer positive and negative electrodes, middle layer positive and negative electrodes and lower layer positive and negative electrodes (where 3 and 4 are a pair of positive and negative electrodes, 6 and 7 are a pair of positive and negative electrodes, and 9 and 10 are a pair of positive and negative electrodes), a polyvinylidene fluoride column 1, a first stress electromagnetic conversion material layer 2, a second stress electromagnetic conversion material layer 5, a third stress electromagnetic conversion material layer 8, a fourth stress electromagnetic conversion material layer 11, and three annular polyvinylidene fluoride synapses 12, 13, and 14 on the polyvinylidene fluoride column 1.

The positive electrodes of the three pairs of positive and negative electrodes are connected with a positive electrode of a power supply (in an upper layer positive and negative electrode pair, 3 is the positive electrode and 4 is the negative electrode; in a middle layer positive and negative electrode pair, 6 is the positive electrode and 7 is the negative electrode; in a lower positive and negative electrode pair, 9 is the positive electrode and 10 is the negative electrode), and the negative electrodes are connected with a negative electrode of the power supply. The positive electrode and the negative electrode of each pair of positive and negative electrodes are not in a same plane, all the positive electrodes are connected with a positive electrode of a voltage source, and all the negative electrodes are connected with a negative electrode of the voltage source. The three annular polyvinylidene fluoride synapses 12, 13 and 14 on the polyvinylidene fluoride column 1 are integrated with the polyvinylidene fluoride column 1, and the polyvinylidene fluoride synapses 12, 13 and 14 are annular structures. Overlaps between all the positive and negative electrodes and the annular polyvinylidene fluoride synapses 12, 13, and 14 are annular structures, with same sizes as the annular polyvinylidene fluoride synapses 12, 13, and 14. At opposite parts of the electrodes, all the electrodes have rectangular protrusions connected to annular parts of all the electrodes, making it easy for the electrodes to connect with the positive and negative electrodes of the voltage source. The positive and negative electrode pairs are respectively clamped at two ends of each of the annular polyvinylidene fluoride synapses 12, 13 and 14 (the positive electrode 3 and the negative electrode 4 are clamped at the both ends of the annular polyvinylidene fluoride synapse 12; the positive electrode 6 and the negative electrode 7 are clamped at both ends of the annular polyvinylidene fluoride synapse 13; and the positive electrode 9 and the negative electrode 10 are clamped at both ends of the annular polyvinylidene fluoride synapse 14), and the positive and negative electrodes are sleeved on the polyvinylidene fluoride column 1 in an order shown in FIG. 1. All the annular polyvinylidene fluoride synapses 12, 13 and 14 integrally connected with the polyvinylidene fluoride column 1 have a same thickness and a same size. Other parts of the polyvinylidene fluoride column 1 are coated with stress electromagnetic conversion materials (the first stress electromagnetic conversion material layer 2, the second stress electromagnetic conversion material layer 5, the third stress electromagnetic conversion material layer 8 and the fourth stress electromagnetic conversion material layer 11), and end sections of the first stress electromagnetic conversion material layer 2 and the fourth stress electromagnetic conversion material layer 11 are also coated with stress electromagnetic conversion materials. By applying a same voltage to the three pairs of positive and negative electrodes, driven by the voltage, the annular polyvinylidene fluoride synapses 12, 13 and 14 are caused to vibrate, so that the polyvinylidene fluoride column 1 generates stress or flutter at corresponding polyvinylidene fluoride column parts coated with the stress electromagnetic conversion material layers 2, 5, 8 and 11, and then the stress electromagnetic conversion material layers 2, 5, 8 and 11 coated on the polyvinylidene fluoride column 1 generate electromagnetic waves and radiate. Sizes and ranges of the stress electromagnetic conversion material layers 2, 5, 8 and 11 are different, which leads to different radiation uniformity of electromagnetic waves. In practical application, a design may be carried out according to requirements, so that the electromagnetic waves generated by the stress electromagnetic conversion material layers 2, 5, 8 and 11 are in a same frequency and a same phase, achieving a resonance effect and achieving a purpose of electromagnetic wave enhancement.

Applied voltages of the three pairs of positive and negative electrodes are the same, the stress electromagnetic conversion material layers 2, 5, 8, and 11 are different in length, and the annular polyvinylidene fluoride synapses 12, 13, and 14 are the same in size, so that electromagnetic waves with superimposed amplitudes and phases are easily generated, and purposes of electromagnetic field enhancement and gain enhancement are achieved.

The miniaturized ultra-low frequency antenna drives the annular polyvinylidene fluoride synapses 12, 13 and 14 by the three interconnected positive and negative electrodes, and transmits the stress or flutter of the annular polyvinylidene fluoride synapses to corresponding parts of the polyvinylidene fluoride column 1 coated with the stress electromagnetic conversion material layers 2, 5, 8 and 11, thereby driving the stress electromagnetic conversion material layers 2, 5, 8 and 11 to generate electromagnetic radiation. Because dimensions of the stress electromagnetic conversion material layers 2, 5, 8 and 11 are different, the dimensions may be adjusted in engineering application to make the electromagnetic waves generated by the stress electromagnetic conversion material layers 2, 5, 8 and 11 have the same frequency and the same phase, so as to achieve a resonance effect and realize the purpose of electromagnetic wave enhancement.

The miniaturized ultra-low frequency antenna adopts the annular polyvinylidene fluoride synapses, a same polyvinylidene fluoride column and a same electrode structure, and has the rectangular protrusions at edges of the annular structures of the electrodes, so as to facilitate connection with the voltage source. In practical engineering applications, electrodes with different structures and shapes of polyvinylidene fluoride synapses may be designed according to a position of the antenna, which may be round, arc, square, etc., and thicknesses of the annular polyvinylidene fluoride synapses may also be designed according to actual needs, and the thicknesses may be different, so as to control resonance phases and amplitudes, realize the same frequency and in-phase resonance, and also realize the multi-band design.

The three pairs of positive and negative electrodes of the miniaturized ultra-low frequency antenna may be controlled by the DC voltage source, and their voltages are the same. All the positive electrodes are directly connected with a positive electrode of the DC voltage source, and all the negative electrodes are directly connected with a negative electrode of the DC voltage source. Meanwhile, four sections of the stress electromagnetic conversion materials with different sizes are excited to achieve an effect of electromagnetic wave enhancement.

The miniaturized ultra-low frequency antenna according to the disclosure may also be used for designing low frequency, very low frequency antennas, multi-band antennas, broadband antennas and polarization controllable antennas, replacing conventional antenna designs, reducing sizes of the antennas and improving maneuverability and flexibility of the antennas. In addition, design methods and mechanisms of the miniaturized ultra-low frequency antenna and the conventional antennas are completely different. A antenna design is mainly realized through a sequential transmission mechanism of polyvinylidene fluoride synapse-polyvinylidene fluoride column-stress electromagnetic conversion material-electromagnetic radiation and synaptic conduction and stress conversion of new materials, and an omnidirectional and three-dimensional antenna structure may be generated according to actual requirements, so that the design of multi-band antennas, broadband antennas and polarization controllable antennas may be realized.

Embodiment 3

In order to realize a design of a multi-band miniaturized ultra-low frequency antenna, the embodiment of the disclosure provides a miniaturized ultra-low frequency antenna, mainly based on the embodiment 2, including three pairs of positive and negative electrodes, namely upper layer positive and negative electrodes, middle layer positive and negative electrodes and lower layer positive and negative electrodes (where 3 and 4 are a pair of positive and negative electrodes, 6 and 7 are a pair of positive and negative electrodes, and 9 and 10 are a pair of positive and negative electrodes), a polyvinylidene fluoride column 1, a first stress electromagnetic conversion material layer 2, a second stress electromagnetic conversion material layer 5, a third stress electromagnetic conversion material layer 8, a fourth stress electromagnetic conversion material layer 11, and three annular polyvinylidene fluoride synapses 12, 13, and 14 on the polyvinylidene fluoride column 1. Left and right sides of positive and negative electrode pairs may be regarded as positive electrodes or negative electrodes, that is, for an upper layer positive and negative electrode pair, 3 is a positive electrode or a negative electrode, and 4 is a negative electrode or a positive electrode; for a middle layer positive and negative electrode pair, 6 is a positive electrode or a negative electrode, and 7 is a negative electrode or a positive electrode; for a lower positive and negative electrode pair, 9 is a positive electrode or a negative electrode, and 10 is a negative electrode or a positive electrode. However, each of the upper positive and negative electrode pair, the middle positive and negative electrode pair and the lower layer positive and negative electrode pair needs to have a positive electrode and a negative electrode at the same time in one case, and it is necessary to ensure that the positive and negative electrode pairs work. In addition, different voltages may be applied to the upper positive and negative electrode pair, the middle positive and negative electrode pair and the lower layer positive and negative electrode pair, that is, voltage directions and voltage magnitudes of the positive and negative electrode pairs are different, so as to realize a design of a multi-band ultra-low frequency antenna and a broadband ultra-low frequency antenna.

Embodiment 4

Figure 4:
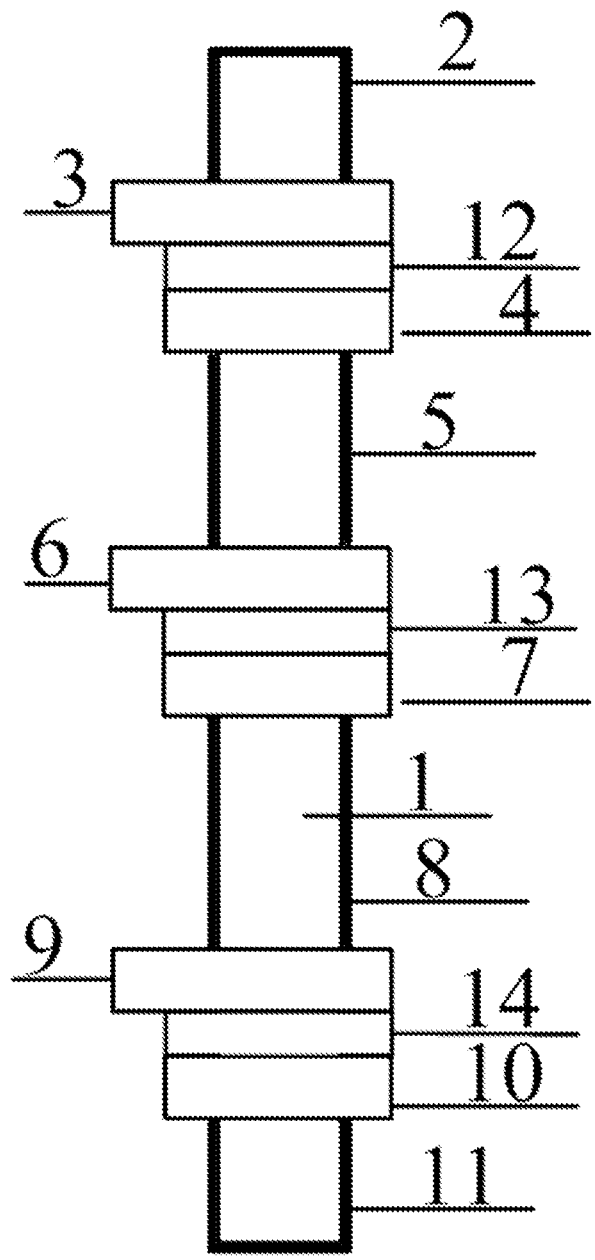
FIG. 4 is a front view of a miniaturized ultra-low frequency antenna according to embodiment 4 of the disclosure.
Figure 5:
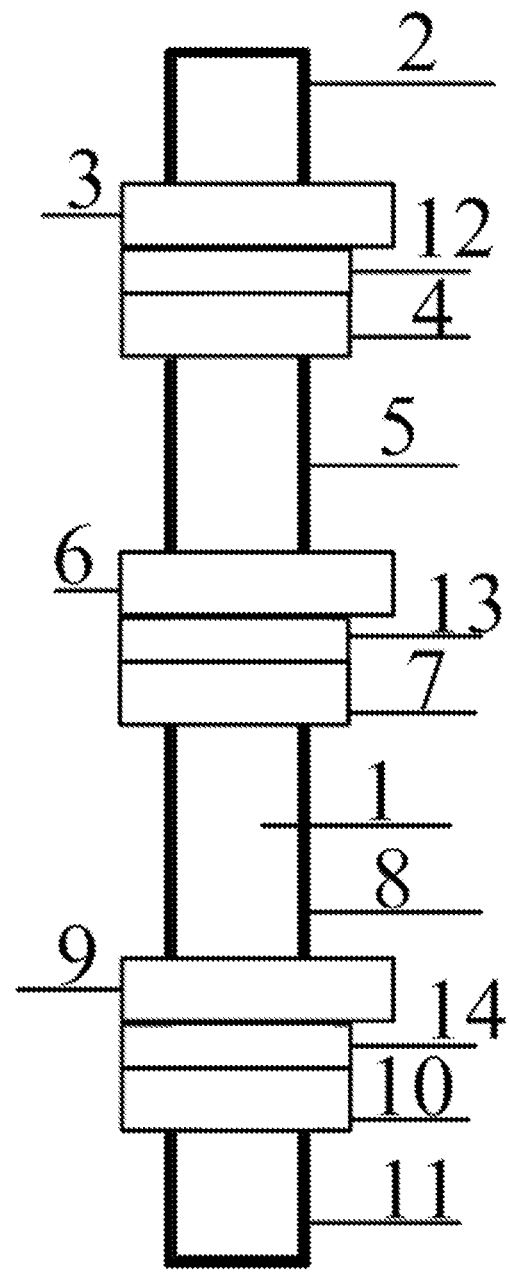
FIG. 5 is a top view of a miniaturized ultra-low frequency antenna according to embodiment 4 of the disclosure.
Figure 6:
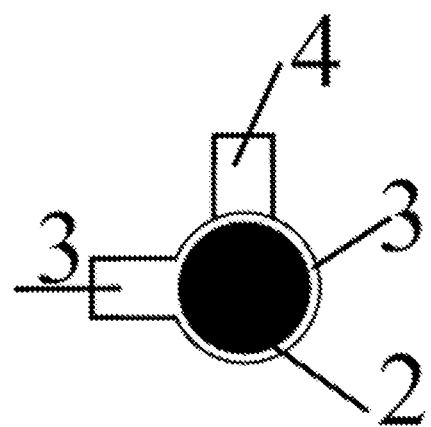
FIG. 6 is a side view of a miniaturized ultra-low frequency antenna according to embodiment 4 of the disclosure.

In order to realize a design of a polarization-controllable miniaturized ultra-low frequency antenna, as shown in FIG. 4, FIG. 5 and FIG. 6, an embodiment of the disclosure provides a miniaturized ultra-low frequency antenna, mainly based on the embodiment 1, including three pairs of positive and negative electrodes, which are upper layer positive and negative electrodes, middle layer positive and negative electrodes and lower layer positive and negative electrodes (where 3 and 4 are a pair of positive and negative electrodes, 6 and 7 are a pair of positive and negative electrodes, and 9 and 10 are a pair of positive and negative electrodes), a polyvinylidene fluoride column 1, a first stress electromagnetic conversion material layer 2, a second stress electromagnetic conversion material layer 5, a third stress electromagnetic conversion material layer 8, a fourth stress electromagnetic conversion material layer 11, and three annular polyvinylidene fluoride synapses 12, 13, and 14 on the polyvinylidene fluoride column 1. The positive electrodes and the negative electrodes of the three pairs of positive and negative electrodes are orthogonal, that is, the positive electrode 3 and the negative electrode 4 are orthogonal, the positive electrode 6 and the negative electrode 7 are orthogonal, and the positive electrode 9 and the negative electrode 10 are orthogonal. According to embodiment 2 and embodiment 3, the voltage directions and the voltage magnitudes of the positive and negative electrode pairs may be the same or different, so as to realize the design of multi-band, broadband and polarization controllable ultra-low frequency antennas, low frequency antenna and very low frequency antennas. In addition, according to the embodiment, a number of electrode pairs may be set as required.

A plurality of positive and negative electrode pairs, polyvinylidene fluoride columns, and stress electromagnetic conversion materials according to the disclosure adopt a voltage-driven mode. The design of multi-band, broadband, polarization controllable ultra-low frequency antennas, low frequency antennas, and very low frequency antennas is realized through different ways and combinations of multi-electrode polarization direction, driving voltage direction and voltage magnitude change. A voltage-driven excitation mode may control voltage magnitude, adjust stress or flutter states of the polyvinylidene fluoride column, realize a flexible design of multi-band, broadband and polarization controllable ultra-low frequency antennas, low frequency antenna and very low frequency antennas, and meet different requirements of antenna gain enhancement, field strength enhancement and multi-band, broadband and controllable polarization. The designed ultra-low frequency antennas, low frequency antennas and very low frequency antennas may be applied to personal communication, medical communication, medical monitoring, underwater communication, air-space-sea integration construction, individual communication, satellite communication, unmanned aerial vehicle communication and detection, etc., so as to realize flexible and diverse deployment and seamless connection between air, space, sea and ground. The miniaturized ultra-low frequency antenna according to the embodiment of the disclosure is used for designing mobile phone antennas, base station antennas and mobile terminal antennas.

The above-mentioned embodiments only describe preferred modes of the disclosure, and do not limit a scope of the disclosure. Under a premise of not departing from a design spirit of the disclosure, various modifications and improvements made by ordinary technicians in the field to the technical scheme of the disclosure shall fall within the scope of protection determined by claims of the disclosure.

What is claimed is:

1. A miniaturized ultra-low frequency antenna, comprising: upper layer positive and negative electrodes, middle layer positive and negative electrodes and lower layer positive and negative electrodes, and a polyvinylidene fluoride column, wherein the polyvinylidene fluoride column is respectively connected with the upper layer positive and negative electrodes, the middle layer positive and negative electrodes and the lower layer positive and negative electrodes; the polyvinylidene fluoride column is coated with stress electromagnetic conversion material layers; the upper layer positive and negative electrodes, the middle layer positive and negative electrodes and the lower layer positive and negative electrodes drive the polyvinylidene fluoride column to generate a deflection force through a voltage, and the stress electromagnetic conversion material layers are prompted to radiate electromagnetic waves and radiate under an action of the deflection force.

2. The miniaturized ultra-low frequency antenna according to claim 1, wherein the polyvinylidene fluoride column is respectively connected with the upper layer positive and negative electrodes, the middle layer positive and negative electrodes and the lower layer positive and negative electrodes through synapses.

3. The miniaturized ultra-low frequency antenna as claimed in claim 2, wherein positive electrodes of the upper layer positive and negative electrodes, the middle layer positive and negative electrodes and the lower layer positive and negative electrodes are placed vertically in parallel or orthogonal.

4. The miniaturized ultra-low frequency antenna according to claim 3, wherein the upper layer positive and negative electrodes, the middle layer positive and negative electrodes and the lower layer positive and negative electrodes are fed by a same direct current voltage source at a same time, or are respectively connected with different voltage sources to realize different voltage feeding.

5. The miniaturized ultra-low frequency antenna according to claim 4, wherein the positive electrodes of the upper layer positive and negative electrodes, the middle layer positive and negative electrodes and the lower layer positive and negative electrodes are located on a same side or on different sides.

6. The miniaturized ultra-low frequency antenna according to claim 1, wherein the upper layer positive and negative electrodes, the middle layer positive and negative electrodes and the lower layer positive and negative electrodes all adopt left parts as the positive electrodes and right parts as negative electrodes.

7. The miniaturized ultra-low frequency antenna according to claim 1, wherein a left part of the upper layer positive and negative electrodes is a positive electrode, and a right part is a negative electrode; a left part of the middle layer positive and negative electrodes is a negative electrode, and a right part is a positive electrode; a left part of the lower layer positive and negative electrodes is a positive electrode and a right part is a negative electrode.

8. The miniaturized ultra-low frequency antenna according to claim 1, wherein left and right electrodes of the upper layer positive and negative electrodes, the middle layer positive and negative electrodes and the lower layer positive and negative electrodes are arranged in an arrangement and combination structure.

9. The miniaturized ultra-low frequency antenna according to claim 1, wherein the miniaturized ultra-low frequency antenna is used to design a mobile phone antenna or a mobile terminal antenna.

\* \* \* \* \*